J. ZAKARKA.
SUGAR PACKING MACHINE.
APPLICATION FILED DEC. 30, 1919.
1,350,130.
Patented Aug. 17, 1920.
2 SHEETS—SHEET 2.
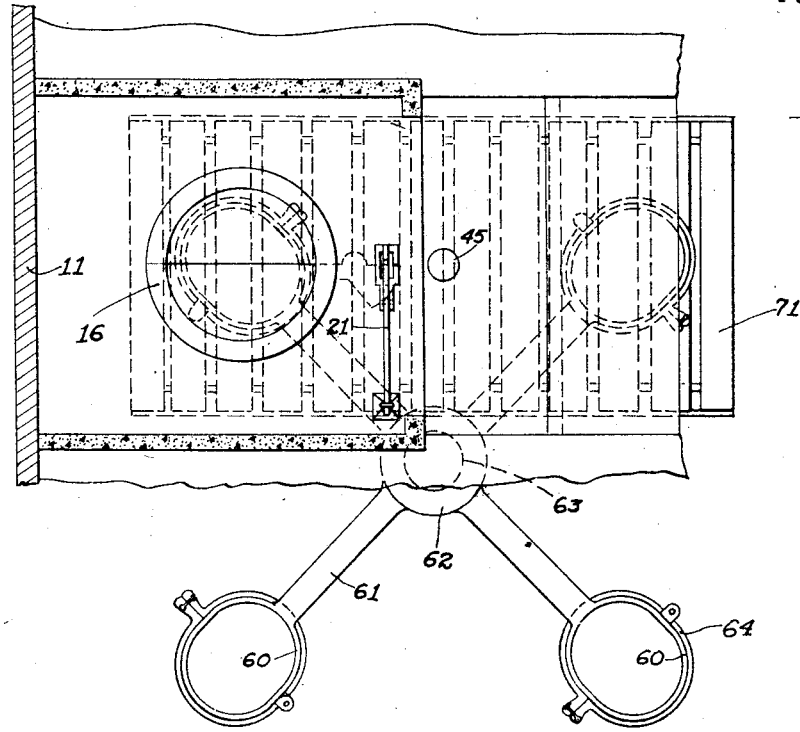
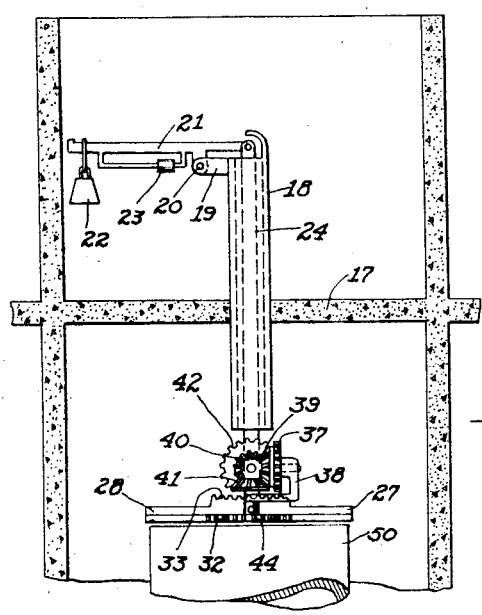
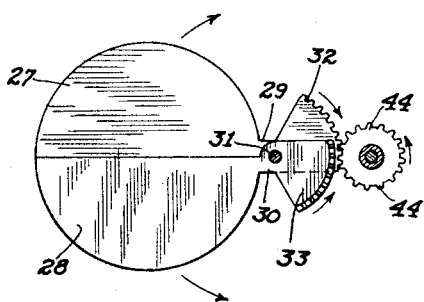
INVENTOR.
Joseph Zakarka
BY
George C. Heinrich
ATTORNEY.

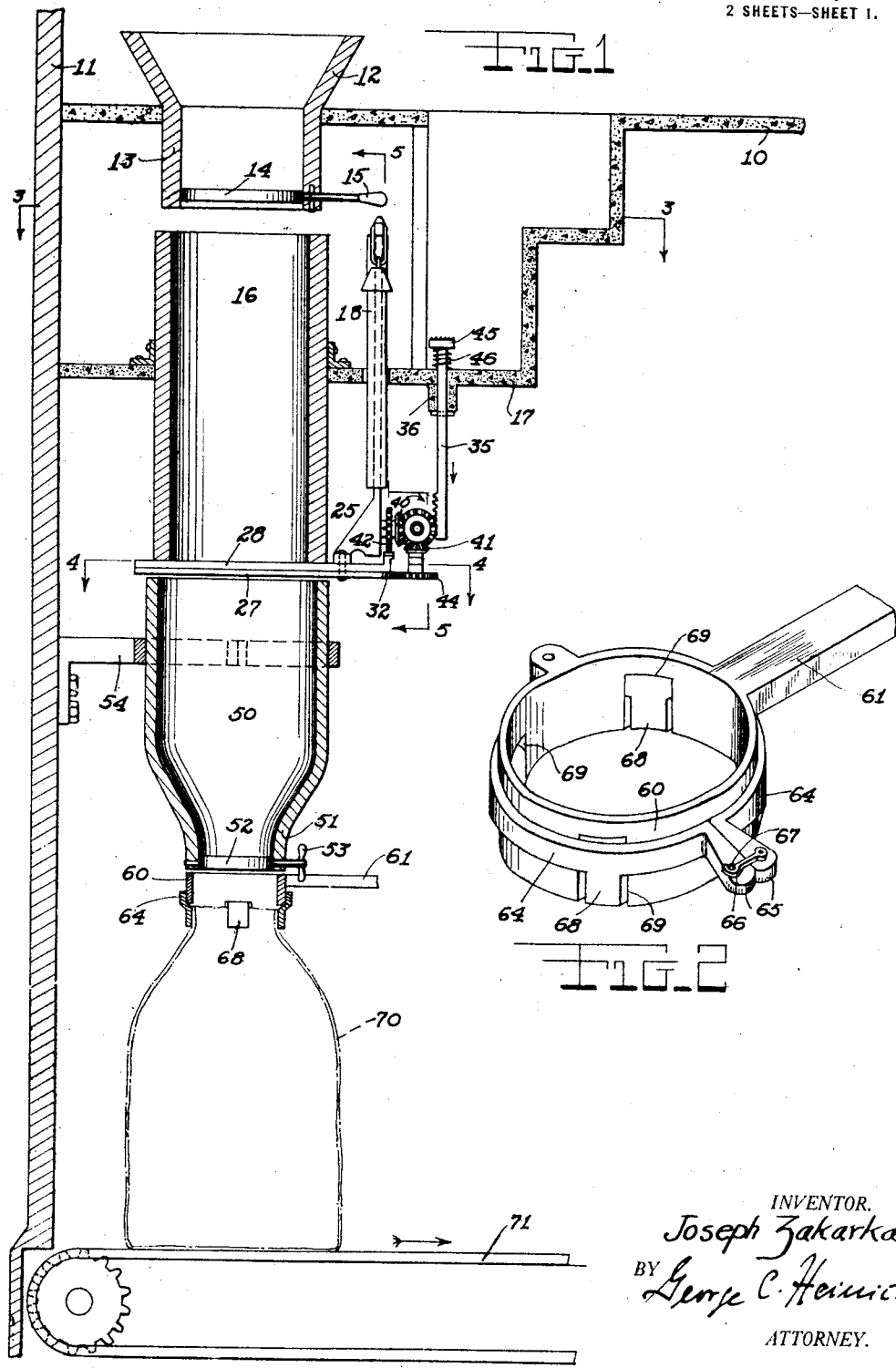

UNITED STATES PATENT OFFICE.

JOSEPH ZAKARKA, OF BROOKLYN, NEW YORK.

SUGAR-PACKING MACHINE.

1,350,130.   Specification of Letters Patent.   Patented Aug. 17, 1920.

Application filed December 30, 1919. Serial No. 348,446.

*To all whom it may concern:*

Be it known that I, JOSEPH ZAKARKA, a citizen of Russia, residing at Brooklyn, county of Kings and State of New York, have invented certain new and useful Improvements in Sugar-Packing Machines, of which the following is a specification.

This invention relates to a bag filling apparatus for filling given quantities of loose material such as sugar, into bags or like receptacles, the invention being intended more particularly for use in sugar refineries although not necessarily limited to such use.

The invention has for a general object to provide an improved apparatus by which an accurately determined quantity of sugar or other loose material may be discharged into a bag or like receptacle.

A further object is to provide an apparatus of this type characterized by simplicity of construction and rapidity of operation.

For further comprehension of the invention, and of the objects and advantages thereof, reference will be had to the following description and accompanying drawings, and to the appended claims in which the various novel features of the invention are more particularly set forth.

Figure 1 of the drawings is an axial vertical sectional view of a bag filling apparatus constructed according to my invention.

Fig. 2 is a detail perspective view of one of the rotary bag holding devices.

Fig. 3 is a horizontal section taken on the line 3—3 of Fig. 1.

Fig. 4 is a detail horizontal section on the line 4—4 of Fig. 1.

Fig. 5 is a fragmentary vertical section at right angle to Fig. 1 and taken along the line 5—5 of the latter.

Referring now to the drawings, 10 indicates a portion of one of the floors of a building such as a sugar refinery, and 11 one of the vertical walls thereof. Supported on the floor 10 is a hopper 12 having its discharge mouth extended downwardly through the floor in the form of an extension 13. At the lower end of this extension 13 is a door 14 provided with a handle 15 whereby it may be opened or closed.

Located below and in axial alinement with the discharge mouth of the hopper is a cylindrical measuring chute 16 of slightly larger diameter than the said mouth, this chute extending downwardly through, and being supported by, a platform 17 located at a distance below the floor 10 and supported in any suitable manner.

Supported by the platform 17 is a weighing device of the steelyard type, commonly referred to as a scale. The pan of this scale, which will be presently further referred to, extends under the chute 16 and normally closes the lower end thereof. The frame of this scale comprises a hollow post 18 extending through and suitably supported by the platform 17 and having a lateral lug 19 on its upper end to which is fulcrumed as at 20 the scale lever 21 of the usual type and provided with the movable balance weights 22 and 23. Suspended from the inner end of the lever 21 is a rod 24 which extends freely through the post 18 and has a rigid foot 25 on its lower end to which the pan is secured.

The pan is illustrated more particularly in Fig. 4 and comprises a pair of semi-circular halves 27 and 28 formed on one side with the laterally projecting lugs, 29 and 30 respectively, which overlap one another and are pivotally connected to a pin 31 which extends downwardly from the foot 25 therethrough. These lugs widen into a pair of gear segments 32 and 33 concentric to the pivot pin 31. These gear segments are operated to separate the halves of the pan by means of a rack bar 35 vertically slidable in guides 36 in the platform 17 and engaging a spur gear 37 rotatable on a bracket 38 and having fixed co-axially thereto a bevel gear 39 meshing with a pair of smaller bevel gears 40 and 41, the former of which is mounted on the foot 25 and the latter on an extension of the bracket 38. The gear 40 has fixed co-axially thereto a planetary gear 42 which meshes with a segment 33, while the gear 41 has fixed thereto a spur gear 44 which meshes with the spur segment. The bar 35 has a fixed head 45 adapted to be depressed against the action of a spring 46 by the foot of the operator, the spring 46 automatically returning the bar to raised position with the pan halves united.

Extending downwardly from the chute 16 in axial alinement therewith is a delivery funnel 50 whose upper end is spaced below the lower end of the chute 16 just sufficient distance to accommodate the pan of the scale, the upper portion of this funnel being slightly larger than the chute, the funnel tapering down to a restricted neck 51 provided with a swinging door 52 operable by a handle 53. This funnel may be supported by a bracket 54 fixed to the wall 11.

The bags to be filled are secured to oval rings or bands 60 fixed on the ends of arms 61 radiating from a hub 62 on a standard 63. Hinged to one side of each of these rings 60 is a clamp made up of a pair of curved fingers 64 which jointly encircle the ring and have handles 65 on their outer ends adapted to be secured together by means of a hook 66 on one handle engaging a pin 67 on the other. The fingers are provided with projections 68 adapted to engage in recesses 69 in the band. The device just described is so located that when swung on the standard 63 the bags are brought under the funnel 50 the rings 60 being slightly larger than the mouth of the latter. One of the bags is shown in position in broken lines at 70 in Fig. 1.

When filled, the bags rest upon an endless conveyor 71 of ordinary type and driven by any suitable means, one end of which extends under the apparatus and by which the filled bags are conveyed away.

In operation of the apparatus one attendant stands on platform 17 weighing the sugar and delivering it to the funnel 50, while a second attendant fixes the empty bags on the rings 60 and swings them under the funnel and removes them from the rings. The attendant on platform 17 first opens door 14, allowing the sugar to fall into the chute until the scale is balanced. He then depresses rack bar 35, causing the two halves of the pan to swing apart and the measured quantity of sugar to fall into the delivery funnel. When the bar is then released the spring 46 automatically raises the latter causing the two halves of the pan to swing together.

The other attendant fixes the bags to the rings 60 swings them under the delivery funnel, opens door 52 and then disengages the bags from the rings, the manner in which the bags are secured to the ring will be apparent, the top edge of the bag being slipped over the ring and the fingers then clamped thereon.

Having thus described my invention what I claim as new and desire to secure by Letters Patent of the United States is—

1. An apparatus of the type described, comprising a hopper, a measuring chute below said hopper, a scale having its pan divided into two halves and adapted to close the bottom of said chute, a delivery funnel below said chute, and means for separating the two halves of said pan, said means comprising gear segments rigid with the respective halves of the pan, a manually operable rack bar, and gear connection between said rack bar and gear segments.

2. An apparatus of the type described comprising a hopper, a measuring chute below said hopper, a scale having its pan divided into two halves and adapted to close the bottom of said chute, a delivery funnel below said chute, a manually operable rack bar, gear segments rigid with the respective halves of the pan, gear connections between said rack bar and gear segments whereby movement of the former will move the said pan halves, and resilient means normally urging said pan halves toward one another.

In testimony whereof I have affixed my signature.

JOSEPH ZAKARKA.